United States Patent
Cahill

(10) Patent No.: US 9,014,644 B2
(45) Date of Patent: Apr. 21, 2015

(54) PROXIMITY DETECTION USING DIVERSITY PATH LOSS SAMPLING

(75) Inventor: Stephen Cahill, Felton, CA (US)

(73) Assignee: Plantronics, Inc., Santa Cruz, CA (US)

( * ) Notice: Subject to any disclaimer, the term of this patent is extended or adjusted under 35 U.S.C. 154(b) by 209 days.

(21) Appl. No.: 13/529,964

(22) Filed: Jun. 21, 2012

(65) Prior Publication Data
US 2013/0344815 A1 Dec. 26, 2013

(51) Int. Cl.
*H04B 17/00* (2006.01)
*G01S 11/06* (2006.01)
*H04W 64/00* (2009.01)

(52) U.S. Cl.
CPC .............. *G01S 11/06* (2013.01); *H04B 17/27* (2013.01); *H04B 17/318* (2013.01); *H04B 17/336* (2013.01); *H04W 64/00* (2013.01)

(58) Field of Classification Search
CPC .................................................. H04B 17/0057
USPC ............. 455/67.11, 67.13, 226.1–226.3, 513, 455/552.1, 556.1
See application file for complete search history.

(56) References Cited

U.S. PATENT DOCUMENTS

| | | | |
|---|---|---|---|
| 8,107,423 B2* | 1/2012 | Hung | 370/328 |
| 8,270,905 B1 | 9/2012 | Cahill et al. | |
| 2009/0156126 A1* | 6/2009 | Willis | 455/41.3 |
| 2010/0159840 A1* | 6/2010 | Rosener et al. | 455/67.11 |
| 2011/0092157 A1 | 4/2011 | Clark et al. | |
| 2011/0098076 A1* | 4/2011 | Kim et al. | 455/522 |

OTHER PUBLICATIONS

Rosener, "Decreasing RSSI Settling Time in Low-Power Mode Systems," U.S. Appl. No. 13/191,248, filed Jul. 26, 2011.

* cited by examiner

*Primary Examiner* — Tuan H Nguyen
(74) *Attorney, Agent, or Firm* — Chuang Intellectual Property Law

(57) ABSTRACT

Methods and apparatuses for radio proximity detection are disclosed. In one example, a method for determining a proximity of a mobile radio includes determining an initial range of a mobile radio in relation to a base radio, and processing the initial range determination to determine whether to make a refined range determination utilizing signal measurements from both a base radio first antenna and a base radio second antenna.

25 Claims, 9 Drawing Sheets

PROXIMITY DETECTION USING DIVERSITY PATH LOSS SAMPLING

BACKGROUND OF THE INVENTION

Often in communications, it is desirable to know the relative position of a radio with respect to its communication base (also referred to herein as a "base station", "base unit", "base radio", or simply "base"). In one example application, this information is useful in systems related to "presence". The term presence generally refers to information about a user's ability or willingness to communicate. In the prior art, the concept of using presence in communication systems is often applied in instant messaging systems. Presence is also used in other network communication systems, such as the Microsoft Unified Communication Service. As applied to the field of headsets, typical presence information may include, for example, whether the headset is being worn by the user, the proximity of the user to the base station, other usage information related to the headset, and whether the user desires to be called.

In some applications, the position information required may be an in-proximity or not-in-proximity binary state, namely either a closer proximity or relatively farther proximity, with the threshold between the two states set by the application. The terms "status" and "state" may be used interchangeably herein. One indicator of relative position is received radio signal strength. Often a number is assigned to this strength and is referred to as the received signal strength indication (RSSI). Most manufacturers who report RSSI generally estimate the received signal power at the antenna either by direct measurement, or digital signal processing, and generate RSSI values that are monotonically related to the received signal power. The number is often calibrated to track power linearly and report the value in dBm.

Received signal strength depends on transmit power level, the direct line of sight and reflection path distances between transmitter and receiver, and the phasing of any reflected radio waves received, where the reflected radio waves are referred to as multi-path. As the direct line of sight distance increases for a fixed transmit power, the received amplitude decreases in general, but can vary about in amplitude around this trend due to reflections. In some situations, the direct path is blocked and only reflections are received.

When the direct path is not blocked, relatively large decreases in received signal strength, referred to as signal "nulls" or "fades" can be caused by reflectors. If the reflector is placed so that the signal path from the source to the receiver, bouncing off the reflector, is an even multiple of a half-wavelength different from the path length of the direct wave, the direct and reflected waves can constructively interfere, resulting in a signal "peak" where the received amplitude may be twice as large as the direct path alone. In general, accurate predictions of real situations are difficult, but one can state in general that the actual received signal strength indication can vary by +6 dB to −infinity depending on the reflector configuration for a simple two-path system. When the direct path is blocked, signal nulls can also occur, and generally RSSI will decrease with distance.

Determining a person's relative position to a base station is a useful input to establishing someone's presence. For example, it can indicate that a person is in audio range to hear an alarm, visual range to see a display, or just that they are in their work area as opposed to on-break. This aspect of their presence can be reported back to a monitor, or provided to someone wishing to communicate with that person. In many cases all that is needed is a rough measure of relative position, either the person is within a certain proximity (i.e., in-proximity) or not (i.e., not-in-proximity) from the base station or object of interest. The precise distance defined by an in-proximity state or not-in-proximity state may be varied depending on the particular application.

In the prior art, a variety of means have been used to determine relative position between two radio devices. These techniques have included time-of-flight measurement, which is complex and expensive and so unsuitable to a headset application, or have used signal level in the absence of a noise-reduction technique to be described, using instead other techniques such as long-term averaging, and have tolerated the slow response time and errors inherent in these approaches. Location has commonly also been done using direct geolocation services and reporting, such as an incorporated GPS receiver and reporting to a communications application. This is unsuitable for a headset application due to size and cost issues, as well as industrial design factors.

As described earlier, radio signal strength indication has been used to indicate relative location. The RSSI may have a monotonic non-linear relationship. A calibrated mapping could be made for relative distance versus RSSI. Alternatively a threshold level for RSSI can be set, creating a binary indicator of either in-proximity or not-in-proximity. Other prior art techniques for relative location include the use of GPS, pulse time delay, and triangulation based on access points.

One advantage of RSSI is that it is usually accessible by software in a radio equipped device, being a measured quantity needed for dynamically optimizing radio system operation. No significant processing or additional components are required like GPS, pulse time delay and triangulation.

However, the use of RSSI to determine relative position may be problematic due to signal nulls resulting from multi-path. This can lead to a false not-in-proximity state determination where a not-in-proximity state is determined by the RSSI dropping below some threshold. There also can be signal peaks due to multi-path which occasionally-cause false in-proximity state determinations.

FIG. 1 is a diagram illustrating direct and reflected path lengths for a headset located at a distance from its radio base station. The simplified system shown in FIG. 1 includes a base station 100 that is the source of a radio signal, a headset 102 and a reflecting surface 104. The signal received at headset 102 is the vector sum of a direct-path signal and a reflected-path signal. As shown in FIG. 1, the signal received at headset 102 is the vector sum of the direct-path signal 106 and reflected-path signal 108. When the relative path lengths are such that the direct-path signal 106 and reflected-path signal 108 arrive in phase, the resultant sum is additive and the received signal level is higher than for just the direct path alone. This may result in a signal peak that is not indicative of the distance between base station 100 and headset 102. When the direct and reflected signals arrive out of phase the resultant sum is subtractive and the received signal level is less than for just the direct path alone. This attenuation may result in a signal null that is not indicative of the distance between base station 100 and headset 102.

As a result, there is a need for improved methods and apparatuses for mobile radio ranging relative to its radio base.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
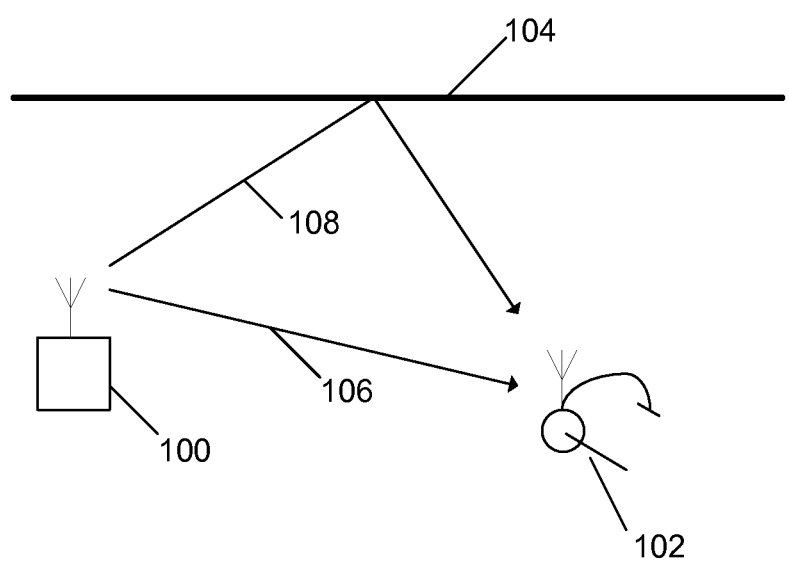
FIG. 1 is a diagram illustrating direct and reflected path lengths for a headset located at a different distance from its radio base station.

Methods and apparatuses for radio proximity determination are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates generally to proximity determination of a mobile radio relative to its base radio with reduced probability of error. The methods and systems described herein provide improved reliability in determining proximity between two radio devices, at least one of which is mobile. In one example, both the mobile radio and its base radio are wireless devices. In one example, this description describes a method and apparatus for a determining a proximity of a mobile radio, such as a headset, utilizing switching between two or more antennas. RSSI is measured for use by a proximity determination application to indicate proximity as opposed to optimizing data throughput. In one example, a base radio in the form of a radio base station includes a radio subsystem with two or more antennas diverse in one or more of the following: space, pattern, and polarization. The radio subsystem includes an antenna switch for creating antenna diversity or may comprise two independent receivers each reporting RSSI and connected to one or more receive antennas.

The antenna switch is controlled by a PIO port on a processor in the base unit. When an estimate of proximity is desired, the base antenna connector is switched between antennas and an RSSI measurement is made for each antenna. Due to the diversity of the antennas, signal nulls and peaks due to multi-path are less commonly expected to occur for all antennas at the same time. The result is that a proximity determination is made based on both antennas or the several antennas, for a system in which the received signal strength is measured by means of more than two antennas. In this manner, adverse effects of nulls and peaks are reduced.

In one example, the base radio is in the form of a USB dongle and includes a first antenna and a second antenna diverse from the first antenna. In one example, a spatial diversity between the first and second antenna operates to eliminate the adverse affect of a null of a single antenna. In a further example, the mobile radio rather than the base radio has two different antennas to provide the desired antenna diversity.

In one example embodiment, a method for determining a proximity of a mobile radio includes determining an initial range of a mobile radio in relation to a base radio, and processing the initial range determination to determine whether to make a refined range determination utilizing signal measurements from both a base radio first antenna and a base radio second antenna.

In one example, a method for determining a proximity of a mobile radio includes determining a mobile radio is within a predetermined range of a base radio and measuring two or more RSSI values at two or more antennas at a base radio. An average RSSI value is generated from the two or more RSSI values, and a mobile radio proximity to the base radio is determined utilizing the average RSSI value.

In one example, a computer readable storage memory stores instructions that when executed by a computer cause the computer to perform a method for determining proximity of a mobile radio. The method includes receiving a first RSSI data associated with a first base radio antenna, receiving a second RSSI data associated with a second base radio antenna, determining an average RSSI value utilizing the first RSSI data and the second RSSI data, and determining a proximity of a mobile radio to a base radio utilizing the average RSSI value.

In one example, a method for determining a proximity of a mobile radio includes determining a noise level on a communications channel between a mobile radio and a base radio. The noise level is processed to determine whether to make a range determination utilizing signal measurements from both a base radio first antenna and a base radio second antenna. For example, the noise level is determined by measuring a bit error rate or an RF signal-to-noise ratio.

In one example embodiment, methods and systems are described whereby a headset adapter system is connected to a personal computer (PC) or similar device. The headset adapter system in conjunction with an application operating on that device, provides an in-proximity or not-in-proximity indication to another or other application(s) running on that PC or in communication with that PC.

Advantageously, the methods and systems presented provide a reliable proximity indication. In the known art multi-path fading with or without selection diversity for best path loss disturbs an estimate of the distance between the user wearing the headset and the system's base, said disturbance occurring by means of error or noise added to an estimate of the range, said estimate obtainable by measuring the signal strength at one or both ends of the radio link from time to time, the transmit signal level at the other end of the link being known, and by means of a path loss vs. distance relationship. This disturbance of the estimated range by noise causes a decision based on the estimated range as "in proximity" or "not in proximity" to be incorrect. The methods and systems described herein provide a means for reducing the frequency and duration of these incorrect-decision events is desired. In one example, noise reduction in the proximity detection is provided using space-domain diversity path loss sampling with adaptive channel error gating.

In one example, a modification and extension of the standard DECT antenna selection diversity system is made in which an estimate of the path loss over a number of propagation paths is obtained. Conventionally, a DECT system has two antennas at the base end of the radio link. At the start of each transmit burst from the headset to the base, the base measures the received signal level at each of the two antennas, and selects to use the antenna with the best signal strength for the balance of the received signal burst. This selection is preserved for the base-to-headset transmission that follows in the second half of the TDMA frame; by this means, transmissions in both directions use the lowest-loss path, assuming that the path choice remains the same in the time interval between the selection made for the base's receive slot and the base's transmit slot. This is conventionally the case, as long as the user is moving at less than about 8 feet per second.

The modification in one example embodiment comprises making a first noisy estimate of range based on signal strength, and then reducing the noise in subsequent estimates of range by means of the method as follows:

Diversity selection being most valuable at longer ranges than the range at which proximity or not-proximity is expected to be useful, the system uses at short-range the diversity-selection hardware to "mix" or "stir" the sample of path losses input to a time average so as to include a multiplicity of different paths with different and independent geometries in the sample-set. This results in a reduction in the error for estimating the path loss as obtained otherwise for samples of an averaged single best-loss path, said single best-loss path being possibly unrepresentative of the true average path loss in response to a possible multipath "up fade", whereby the combination of several propagation rays between those two "best" antennas is in-phase and so results in an anomalously-high observed received signal level, particularly in response to the end user remaining more or less motionless.

If the user is not motionless, the user's motion would naturally result in averaging the samples over a variety of physical paths, a path's loss effectively having a spatial correlation over a span of about 4 cm in physical placement. Methods and systems described herein are advantageous in addressing the defect of an RSSI-based ranging system that arises in a multipath/faded environment if the user remains motionless in a peak or a null.

In one example, two base antennas are utilized. In a further example, four antennas in the base are utilized. Improved performance is enabled with as few as two antennas operating in a round-robin mode at short range. Advantageously, a better in/not-in-proximity metric is generated.

If the initial range measurement (also referred to herein as a "noisy estimate") indicates that the headset is greater than a threshold distance a refined range measurement is not performed using both antennas at the base station. Any refinement of the estimated range would still produce a not in-proximity result. Furthermore, utilizing both antennas at long range may result in an unacceptably poor overall signal quality level. In one example, this threshold distance is approximately 25 feet. In further examples, this distance may vary based on the particular system implementation and application desired. The selected threshold distance is sufficiently far such that accounting for the margin of the error in the noisy estimate, a not in-proximity distance is assured.

In one example, selecting whether or not to modify the aforementioned diversity selection system to do a round-robin use of all available antennas is based on the determined signal strength in combination with the observed error rate on the digital communications link so obtained, instead of using a "best antenna" selection at all ranges.

Figure 2:
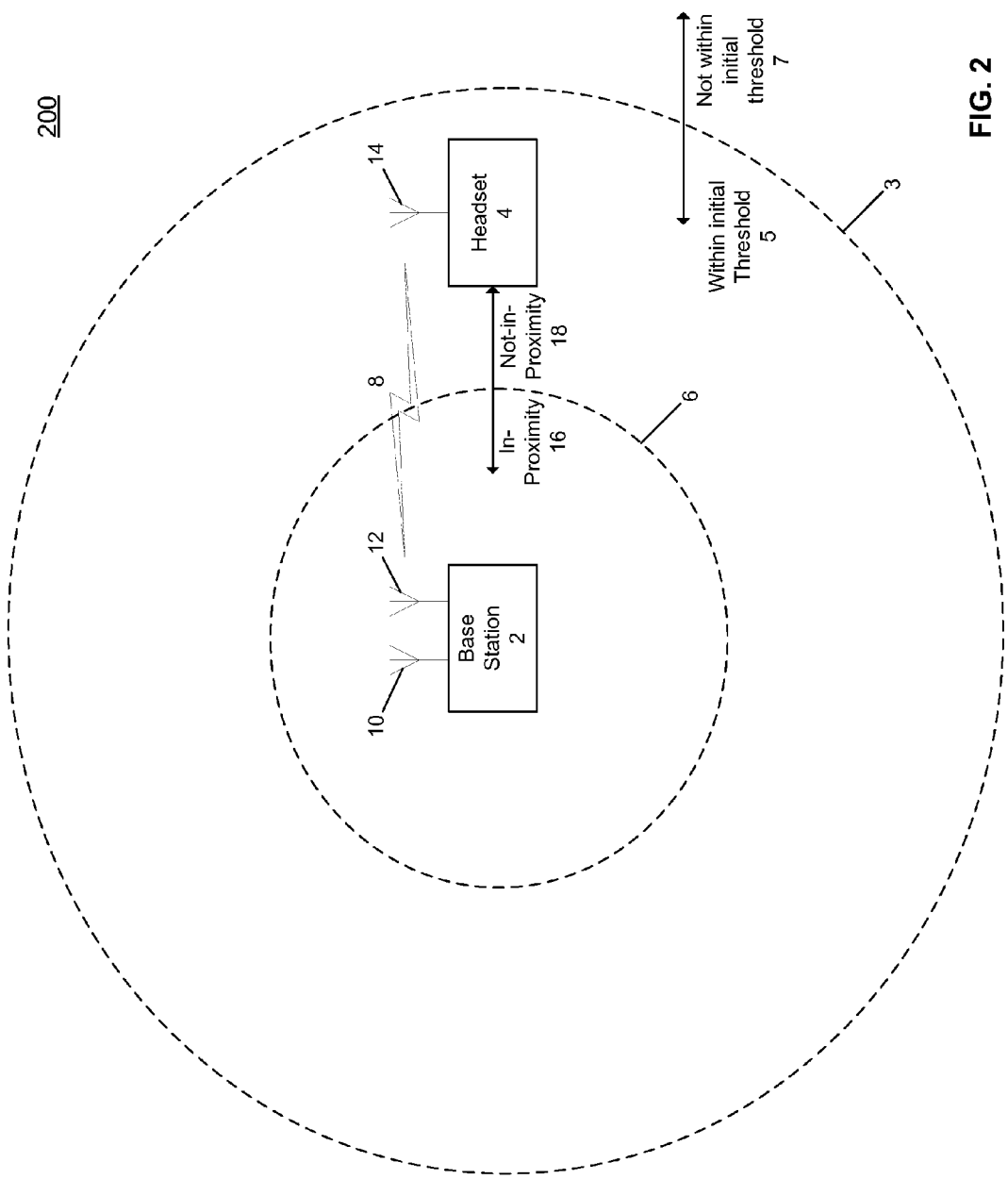
FIG. 2 illustrates proximity sensing of a headset in relation to a base station.

FIG. 2 illustrates proximity sensing of a headset in relation to a base station. The term "headset" refers to any type of device which may be worn or mounted on a user's head. FIG. 2 is a drawing illustrating how RSSI may be employed to determine proximity of a headset to a base station, in accordance with an aspect of the present invention. A system 200 includes a headset 4 and a base station 2 capable of wireless communication therebetween. Base station 2 is coupled to a telecommunications network, either directly or indirectly via a computing device. In one example, base station 2 may be used to route calls to multiple wireless headsets. The base station 2 includes an antenna 10 and an antenna 12. The headset 4 includes an antenna 14. The received signal strength indicator (RSSI) of the wireless link 8 is measured and monitored to determine the proximity of the headset 4 from the base station 2 using both antenna 10 and antenna 12 in select circumstances.

The RSSI can be measured and monitored either at the headset 4 or at the base station 2. If measured and monitored at the headset 4, the base station 2 can be configured to query the headset 4 as to what the RSSI is for a signal associated with antenna 10 and a signal associated with antenna 12. Then, the RSSIs for the two signals are used to determine proximity between headset 4 and base station 2. Antenna 10 and antenna 12 may be any type of antenna typically used in mobile applications, including whip-monopoles, PIFA, and PCB resonators.

In system 200, a threshold distance boundary 3 establishes a range from base station 2 below which headset 4 is considered to be within an initial threshold range 5 and beyond which headset 4 is considered to be not within an initial threshold range 7. A proximity boundary 6 establishes a range from base station 2 below which headset 4 is considered to be in an in-proximity range 16 and beyond which headset 4 is considered to be in a not-in-proximity range 18. System 200 utilizes RSSI values measured through both antenna 10 and antenna 12 to determine the proximity range using methods described herein. In one example, the in-proximity range 16 is approximately 10 feet, or the distance in which a user can view their computer display screen. In a further example, this range is varied based on the desired application implementation, such as whether to login a user automatically to his PC because the user is, considered to be at his workstation.

Figure 3:
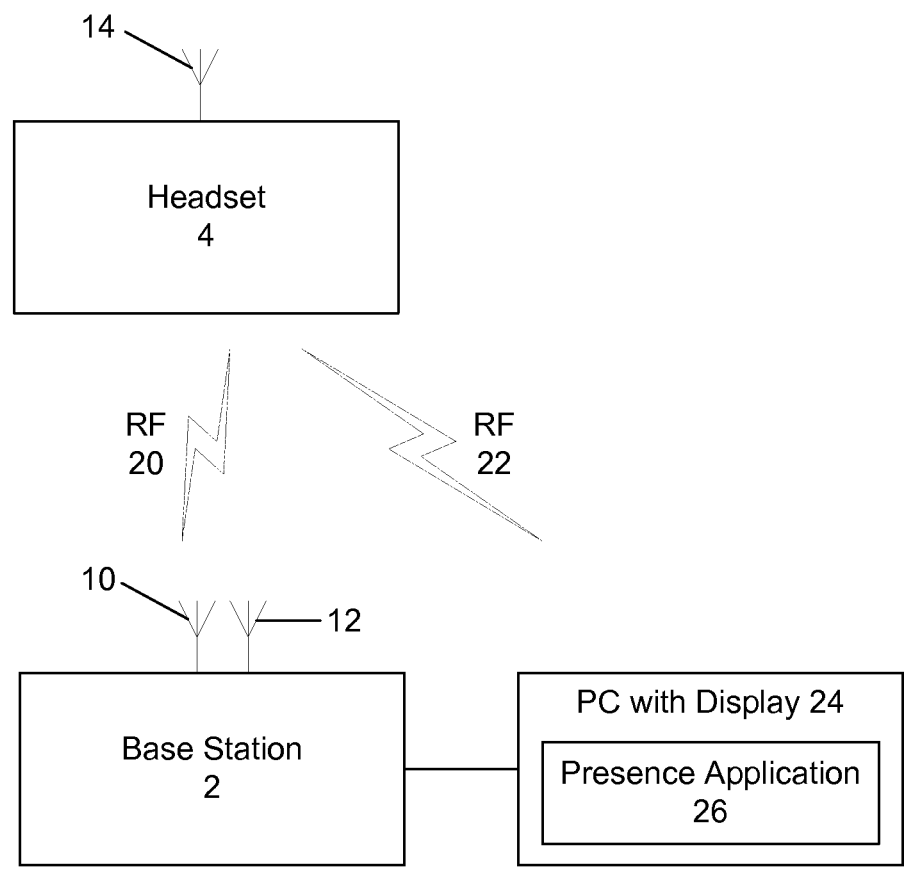
FIG. 3 illustrates a system for proximity sensing of a headset in relation to a base station in one example implementation of the system shown in FIG. 2.

FIG. 3 illustrates a system for proximity sensing of a headset in relation to a base station in one example implementation of system 200 shown in FIG. 2. Referring to FIG. 3, base station 2 is coupled to a personal computer with display 24 executing a presence application 26. For example, presence application 26 may be configured to communicate proximity and usage state information of the headset 4 over a network to which personal computer with display 24 is connected. In a further example, the personal computer with display 24 may be replaced with a mobile handset executing presence application 26, whereby the mobile handset is connected to a network using, for example, WiFi or General Packet Radio Services (GPRS). Further details regarding use of presence applications can be found in the commonly assigned and co-pending U.S. patent application entitled "Headset-Derived Real-Time Presence and Communication Systems and Methods" application Ser. No. 11/697,087, which was filed on Apr. 5, 2007, and which is hereby incorporated into this disclosure by reference for all purposes.

In one example, base station 2 is coupled to personal computer with display 24 using a USB interface. Headset 4 is in communication with base station 2 using either an RF link 20 through antenna 10 or using an RF link 22 through antenna 12.

Figure 4:
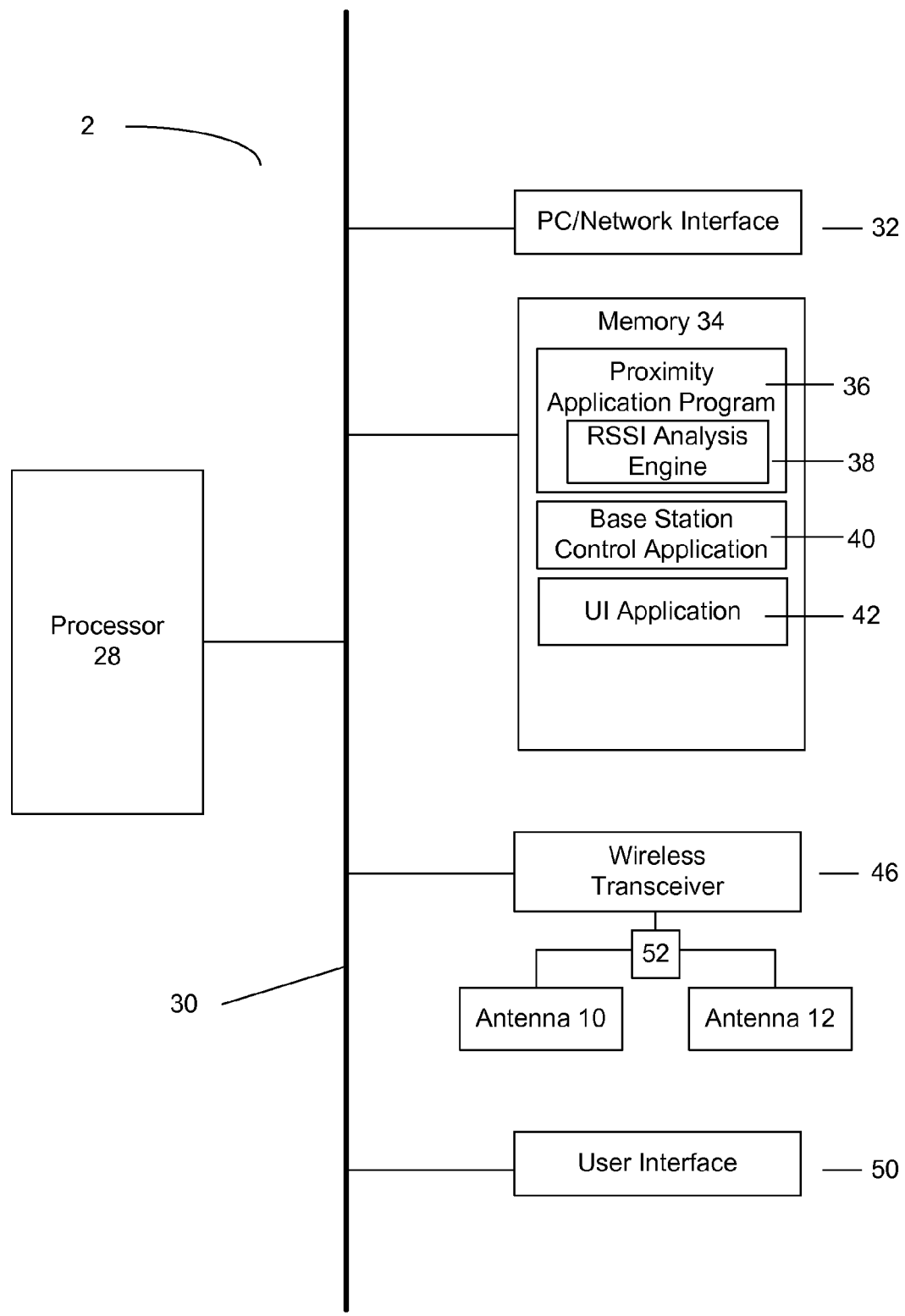
FIG. 4 illustrates a block diagram of a base station with a proximity determination application.

FIG. 4 illustrates a block diagram of the base station 2 with a proximity determination application. Referring now to FIG. 4 in conjunction with FIG. 2, a block diagram of an example of base station 2 is shown. Base station 2 includes a processor 28 operably coupled via a bus 30 to a computer readable memory 34, a wireless transceiver 46 and accompanying antenna 10 and antenna 12, a PC/network interface 32, and a user interface 50. Wireless transceiver 46 may for example, be a DECT transceiver, Bluetooth transceiver, or IEEE 802.11 transceiver. A processor controllable electronic switch 52 is utilized to switch between and thereby transmit and receive through either antenna 10 or antenna 12. The switch 52 may be contained within or be outside of wireless transceiver 46. Antenna 10 and antenna 12 may be diverse in space, radiation pattern, or polarization. The spatial diversity only requires separation of antenna 12 from antenna 10 on the order of one quarter of a wavelength apart.

PC/network interface 32 may be a personal computer interface and/or network interface. For example, the network interface may be an interface to a public switched telephone network, integrated services digital network, local area network, or wireless local area network. In one example, the PC interface is a USB interface. In a further example, base station 2 may include more than two antennas which are utilized in a round robin fashion to make RSSI measurements in a manner substantially similar to the two antenna embodiment.

Processor 28 allows for processing data, in particular managing RSSI data between wireless transceiver 46 and memory 34 for determining the proximity state of headset 4. Processor 28 may include a variety of processors (e.g., digital signal processors), with conventional CPUs being applicable.

Computer readable memory 34 may include a variety of memories, and in one example includes SDRAM, ROM, flash memory, or a combination thereof. Computer readable memory 34 may further include separate memory structures or a single integrated memory structure. In one example, computer readable memory 34 may be used to store passwords, network and telecommunications programs, and/or an operating system (OS).

Computer readable memory 34 stores a proximity determination application program 36 executed by processor 28 to determine proximity state of the headset 4 relative to the base station 2. Proximity determination application program 36 includes an RSSI analysis engine 38 configured to perform RSSI value processing and calculations described herein. Memory 34 may store RSSI values for use by proximity application program to determine the proximity state of headset 4. Memory 34 also includes a base station control application 40 and a user interface application 42. User interface 50 allows for manual communication between the base station user and the base station, and in one example includes an audio and/or visual interface.

In one example operation, proximity determination application program 36 determines an initial range of a mobile radio (e.g., headset 4) in relation to a base radio (e.g., base station 2), and processes the initial range determination to determine whether to make a refined range determination utilizing signal measurements from both a base radio first antenna 10 and a base radio second antenna 12. In one example, proximity determination application program 36 determines an initial range of headset 4 in relation to a base station 2 by estimating a distance utilizing a RSSI value from a signal received at a base station antenna. In one example, the base station antenna is selected associated with a lower path loss between the headset 4 and the base station 2 relative to a base radio non-selected antenna. In one example, processing the initial range comprises determining whether the headset 4 is less than a threshold distance from the base station 2.

If the headset 4 is less than a threshold distance from the base station 2, proximity determination application program 36 causes the headset base station 2 to make the refined range determination by receiving a first signal using antenna 10 and then switching to antenna 12 using switch 52 to receive a second signal. In one example, proximity determination application program 36 makes the refined range determination by measuring a first RSSI value using the base station antenna 10, measuring a second RSSI value using the base station antenna 12, generating an average RSSI value utilizing the first. RSSI value and the second RSSI value, and generating a proximity indication utilizing the average RSSI value. For example, the proximity indication is whether the headset 4 is within a threshold distance from the base station 2. For example, generating the proximity indication utilizing the average RSSI value includes determining whether the average RSSI value is above or below a threshold RSSI value.

Switching between antenna 10 and antenna 12 is performed as rapidly and rarely as possible to minimize time transmitting or receiving using the antenna with the lower RSSI. The RSSI sampling can occur as a normal part of the transceivers pre-existing diversity antenna algorithm used to optimize received signal integrity and merely reported to the proximity application, but can also occur as an autonomous switching operation by the proximity application on a non-diversity-aware transceiver system. After the proximity determination, the switch 52 is positioned so that the antenna with the best RSSI is used, which may occur automatically for a pre-existing diversity-antenna transceiver system.

In further examples, a proximity determination application can reside on either or both the headset 4 and the base station 2. Regardless of where the proximity determination application resides, the result of a proximity determination may be sent to the other device.

In a further example, the proximity determination application program 36 determines the bit error rate (BER) on a communications channel between the headset 4 and the base station 2. The bit error rate is the number of bit errors divided by the total number of transferred bits during a studied time interval, where the number of bit errors is the number of received bits of a data stream over a communication channel that have been altered due to noise, interference, or bit synchronization errors. Proximity determination application program 36 processes the bit error rate in addition to the initial range determination to determine whether to make a refined range determination utilizing signal measurements from both a base station antenna 10 and a base station antenna 12.

If that the bit error rate is above a given threshold rate, the diversity antenna methodology selecting the antenna with the highest RSSI is maintained to ensure the highest possible signal quality and the round robin technique of the base station antennas to determine a refined range is not activated. In a further example, the RF signal-to-noise ratio is measured in place of measuring the bit error rate and utilized in a similar manner.

In one example, the range determination is made by measuring a first RSSI value using the base radio first antenna, measuring a second RSSI value using the base radio second antenna, generating an average RSSI value utilizing the first RSSI value and the second RSSI value, and generating a proximity indication utilizing the average RSSI value. For example, the proximity indication is whether the mobile radio is within a threshold distance from the base radio. In one example, the in-range threshold distance corresponds to a distance at which a user can view a computing device display screen associated with the base radio.

In a further example, proximity determination application program 36 determines whether headset 4 is in motion and processes the headset motion state in addition to the initial range to determine whether to make a refined range determination utilizing signal measurements from both a base station antenna 10 and a base station antenna 12. In one example, motion of the headset 4 is determined utilizing a headset accelerometer. In a further example, motion of the headset 4 is determined by analyzing variations in the RSSI. If the headset 4 is in motion, a refined range determination is not made, as consistent motion implies not present or in attendance immediately at a work station.

In one example, base station 2 is an access point (AP), which is operably coupled with a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (WiFi), and/or voice over interne protocol (VoIP). In one example, the access point includes a transceiver and a processor configured to allow a wireless device (e.g., a headset) access to a network connected to the access point (e.g., via a 10/200 Ethernet RJ-45 port). The AP may be any device that allows wireless-equipped computers and other devices to communicate with a wired network. In one example, the AP is able to support WiFi in general, and the 802.11a, 802.11b, 802.11g, and/or 802.11n wireless networking standards in particular. In other examples, the AP may be able to support other wireless networking standards.

In a further example, proximity determination application program 36 determines if the headset 4 is within a predetermined range of the base station 2. If so, the proximity determination application program 36 measures two or more RSSI values at two or more antennas at the base station 2, generates an average RSSI value from the two or more RSSI values, and determines the headset 4 proximity to the base station 2 utilizing the average RSSI value.

Figure 5:
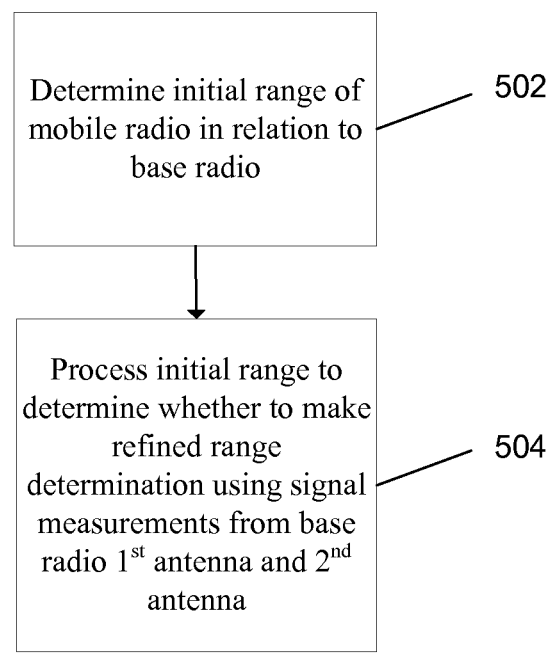
FIG. 5 is a flowchart illustrating a process by which proximity of a mobile radio in relation to a base radio is determined in one example.

FIG. 5 is a flowchart illustrating a process by which proximity of a mobile radio in relation to a base radio is determined in one example. At block 502, an initial range of a mobile radio in relation, to a base radio is determined. In one example, determining an initial range of a mobile radio in relation to a base radio comprises estimating a distance utilizing a RSSI value from a signal received at a base radio selected antenna, the selected antenna associated with a lower path loss between the mobile radio and the base radio relative to a base radio non-selected antenna.

At block 504, the initial range determination is processed to determine whether to make a refined range determination utilizing signal measurements from both a base radio first antenna and a base radio second antenna. In one example, processing the initial range comprises determining whether the mobile radio is less than a threshold distance from the base radio. In one example, the refined range determination is made by measuring a first RSSI value using the base radio first antenna, measuring a second RSSI value using the base radio second antenna, generating an average RSSI value utilizing the first RSSI value, and the second RSSI value, and generating a proximity indication utilizing the average RSSI value. For example, the proximity indication is whether the mobile radio is within a threshold distance from the base radio. For example, generating the proximity indication utilizing the average RSSI value includes determining whether the average RSSI value is above or below a threshold RSSI value.

In one example, the method for determining the proximity further includes determining an error rate on a communications channel between the mobile radio and the base radio, and processing the error rate in addition to the initial range determination to determine whether to make a refined range determination utilizing signal measurements from both a base radio first antenna and a base radio second antenna. In one example, the method for determining the proximity further includes determining a mobile radio motion state comprising whether the mobile radio is in motion, and processing the mobile radio motion state in addition to the initial range to determine whether to make a refined range determination utilizing signal measurements from both a base radio first antenna and a base radio second antenna.

Figure 6:
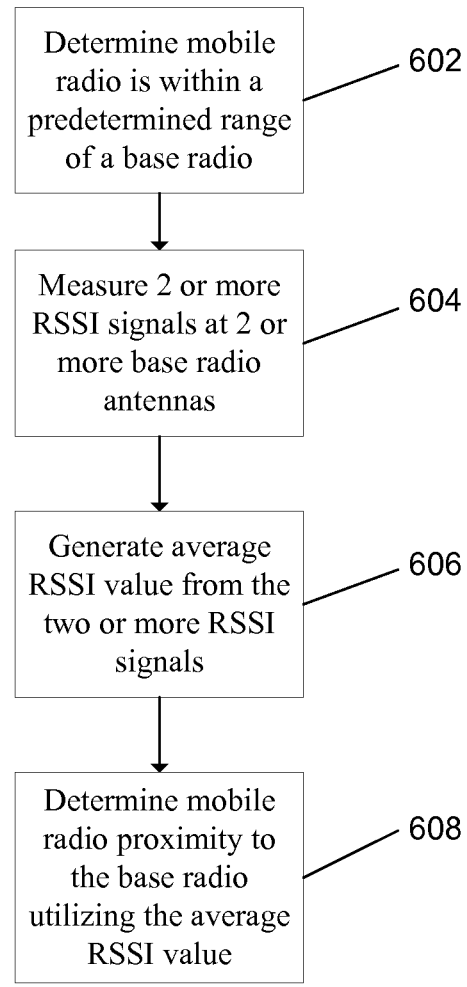
FIG. 6 is a flowchart illustrating a process by which proximity of a mobile radio in relation to a base radio is determined in a further example.

FIG. 6 is a flowchart illustrating a process by which proximity of a mobile radio in relation to a base radio is determined in a further example. At block 602, it is determined that a mobile radio is within a predetermined range of a base radio. In one example, determining the mobile radio is within a predetermined range of a base radio includes estimating a distance utilizing a RSSI value from a signal received at a base radio selected antenna, the selected antenna associated with a lower path loss between the mobile radio and the base radio relative to a base radio non-selected antenna.

At block 604, two or more RSSI values are measured at two or more antennas at a base radio. For example, a RSSI is measured for the signal received at a first antenna and stored in memory. In a further example, multiple RSSI measurements are made. The base station switches to a second antenna diverse from, the first antenna and transmissions between the headset and the base station begin using the second antenna. A RSSI is measured for the signal received at the second antenna and stored in memory. In a further example, multiple RSSI measurements are made.

At block 606, an average RSSI value is generated from the two or more RSSI values. At block 608, a mobile radio proximity to the base radio is determined utilizing the average RSSI value. In one example, determining the mobile radio proximity to the base radio utilizing the average RSSI value includes determining whether the average RSSI value is above or below a threshold RSSI value. In one example, determining the mobile radio proximity to the base radio includes determining whether the mobile radio is less than a threshold distance from the base radio.

In one example, the method for determining the proximity further includes determining whether an error rate on a communications channel between the mobile radio and the base radio is above a threshold level. In one example, the method for determining the proximity further includes determining whether the mobile radio is in motion.

Figure 7:
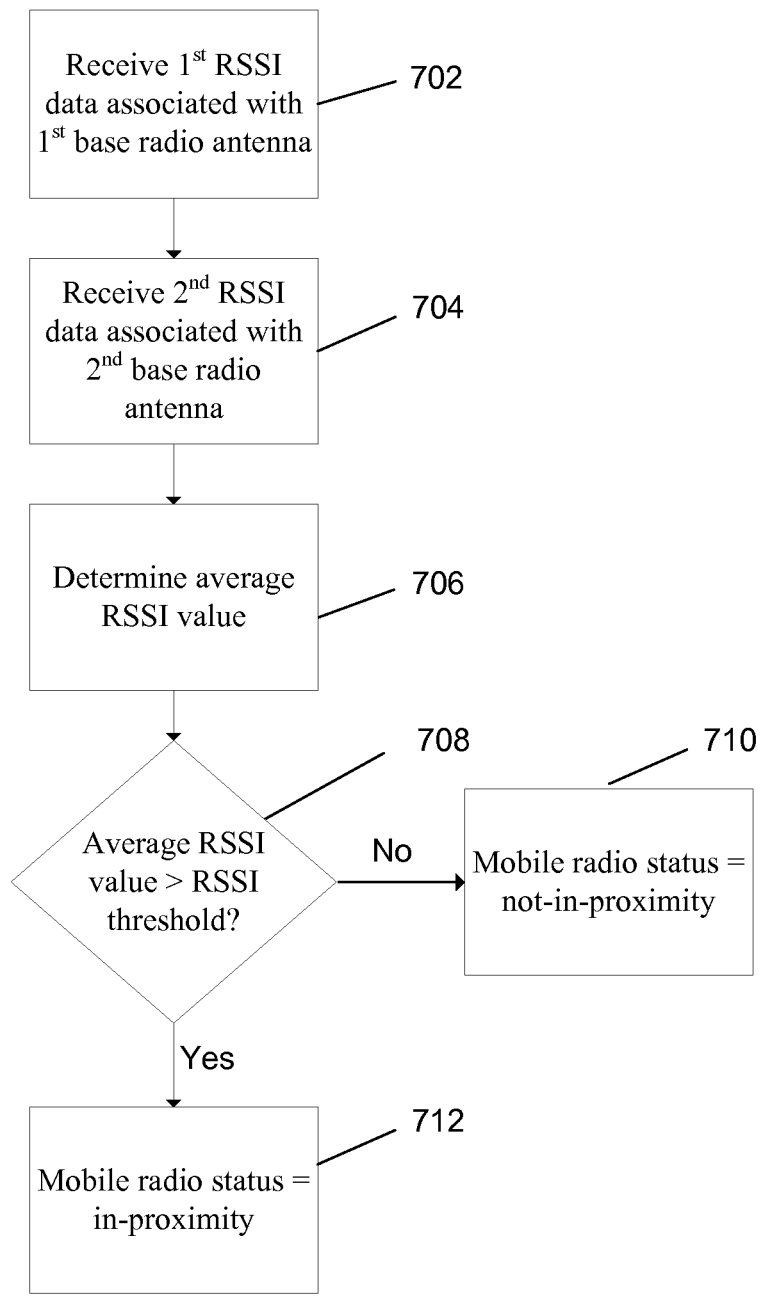
FIG. 7 is a flowchart illustrating a process by which proximity of a mobile radio in relation to a base radio is determined in a further example.

FIG. 7 is a flowchart illustrating a process by which proximity of a mobile radio in relation to a base radio is determined in a further example. At block 702, a first RSSI data associated with a first base radio antenna is received. At block 704, a second RSSI data associated with a second base radio antenna is received. At block 706, an average RSSI value is determined utilizing the first RSSI data and the second RSSI data.

At decision block 708, it is determined whether the average RSSI value is above or below a threshold RSSI value. If no at decision block 708, then at block 710 it is determined that the mobile radio status is a not-in-proximity status. If yes at decision block 708, then at block 712 it is determined that the mobile radio status is an in proximity status. In one example, the method further comprising receiving an initial RSSI data and making an initial range determination prior to receiving the first RSSI data and the second RSSI data.

Figure 8A:
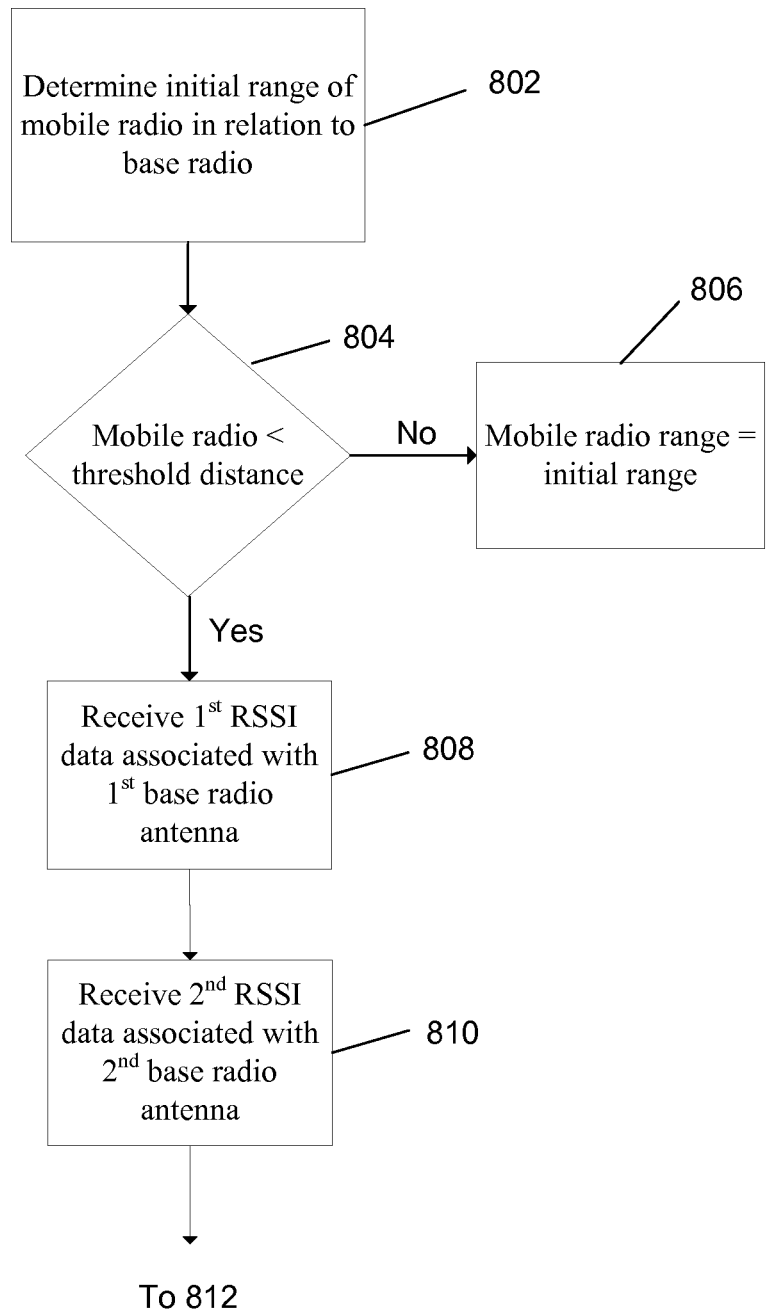
FIG. 8 is a flowchart illustrating a process by which proximity of a mobile radio in relation to a base radio is determined in a further example.
Figure 8B:
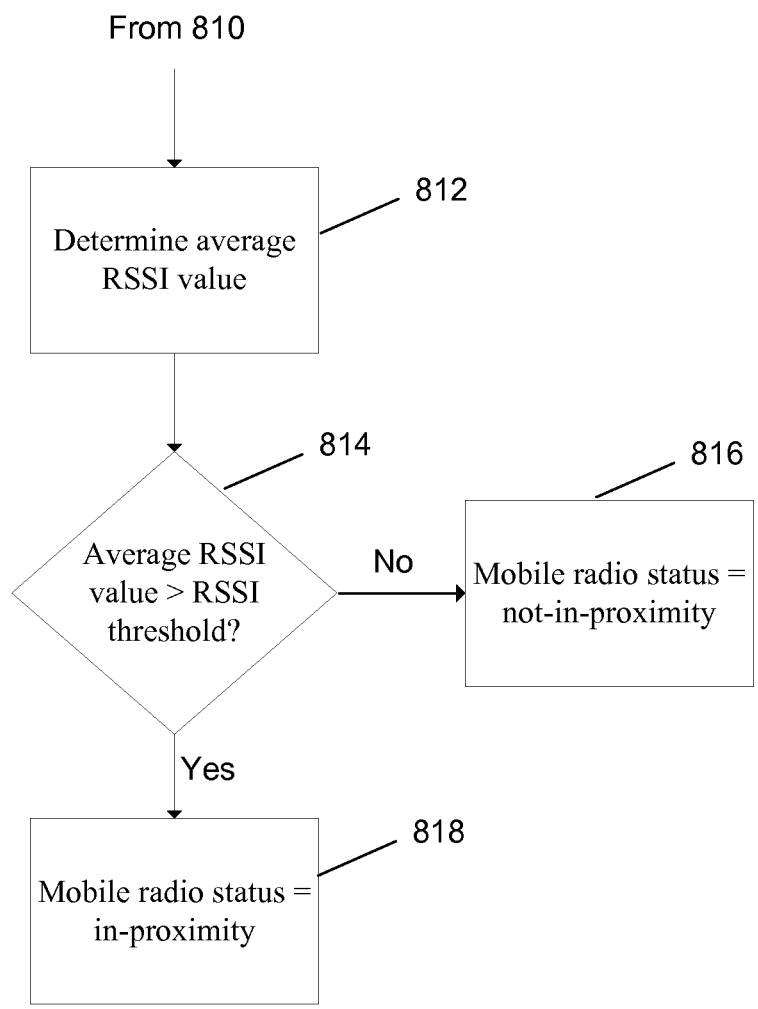

FIG. 8 is a flowchart illustrating a process by which proximity of a mobile radio in relation to a base radio is determined in a further example. At block 802, an initial range of a mobile radio in relation to a base radio is determined.

At decision block 804, it is determined whether the mobile radio is less than a threshold distance. If no at decision block 804, then at block 806 the mobile radio range is set to the initial range and no further refined range determination is made. If yes at decision block 804, then at block 808 a first RSSI data associated with a first base radio antenna is received.

At block 810, a second RSSI data associated with a second base radio antenna is received. At block 812, an average RSSI value is determined from the first RSSI data and the second RSSI data. At decision block 814, it is determined whether the average RSSI value is greater than a threshold RSSI value. If no at decision block 814, at block 816 the mobile radio status is determined to be not-in-proximity. If yes at decision block at 814, at block 818 the mobile radio status is determined to be in-proximity.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Although described in certain examples herein as determining a proximity of a head-mounted device such as a headset in relation to a base unit, the methods and systems described herein may be used to determine a proximity between any two radio devices. For example, the methods and systems described herein may be applied to other body worn or carried devices in addition to headsets. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for determining a proximity of a mobile radio comprising: determining an initial range of a mobile radio in relation to a base radio comprising estimating a distance utilizing a RSSI value from a signal received at a base radio selected antenna; and processing the initial range determination to determine whether to make a refined range determination utilizing signal measurements from both a base radio first antenna and a base radio second antenna.

2. The method of claim 1, wherein the base radio selected antenna is associated with a lower path loss between the mobile radio and the base radio relative to a base radio non-selected antenna.

3. The method of claim 1, wherein processing the initial range comprises determining whether the mobile radio is less than a threshold distance from the base radio.

4. The method of claim 1, further comprising:
determining a bit error rate or signal-to-noise ratio on a communications channel between the mobile radio and the base radio; and
processing the error rate or signal-to-noise ratio in addition to the initial range determination to determine whether to make a refined range determination utilizing signal measurements from both a base radio first antenna and a base radio second antenna.

5. The method of claim 1, wherein the base radio is coupled to a personal computer via a computer interface.

6. The method of claim 1, wherein the base radio and mobile radio utilize a DECT protocol, Bluetooth protocol, or IEEE 802.11 protocol.

7. A method for determining a proximity of a mobile radio comprising: determining an initial range of a mobile radio in relation to a base radio; processing the initial range determination to determine whether to make a refined range determination utilizing signal measurements from both a base radio first antenna and a base radio second antenna; determining a mobile radio motion state comprising whether the mobile radio is in motion; and processing the mobile radio motion state in addition to the initial range to determine whether to make a refined range determination utilizing signal measurements from both a base radio first antenna and a base radio second antenna.

8. A method for determining a proximity of a mobile radio comprising: determining an initial range of a mobile radio in relation to a base radio; and processing the initial range determination to determine whether to make a refined range determination utilizing signal measurements from both a base radio first antenna and a base radio second antenna, wherein the refined range determination is made by: measuring a first RSSI value using the base radio first antenna; measuring a second RSSI value using the base radio second antenna; generating an average RSSI value utilizing the first RSSI value and the second RSSI value; and generating a proximity indication utilizing the average RSSI value.

9. The method of claim 8, wherein, the proximity indication is whether the mobile radio is within a threshold distance from the base radio.

10. The method of claim 8, wherein generating a proximity indication utilizing the average RSSI value comprises determining whether the average RSSI value is above or below a threshold RSSI value.

11. A method for determining a proximity of a mobile radio comprising:
determining a mobile radio is within a predetermined range of a base radio;
measuring two or more RSSI values at two or more antennas at a base radio;
generating an average RSSI value from the two or more RSSI values measured at the two or more antennas at the base radio; and
determining a mobile radio proximity to the base radio utilizing the average RSSI value.

12. The method of claim 11, wherein determining a mobile radio is within a predetermined range of a base radio comprises estimating a distance utilizing a RSSI value from a signal received at a base radio selected antenna, the base radio selected antenna associated with a lower path loss between the mobile radio and the base radio relative to a base radio non-selected antenna.

13. The method of claim 11, further comprising determining whether an error rate on a communications channel between the mobile radio and the base radio is above a threshold level.

14. The method of claim 11, further comprising determining whether the mobile radio is in motion.

15. The method of claim 11, wherein determining the mobile radio proximity to the base radio comprises determining whether the mobile radio is less than a threshold distance from the base radio.

16. The method of claim 11, wherein determining the mobile radio proximity to the base radio utilizing the average RSSI value comprises determining whether the average RSSI value is above or below a threshold RSSI value.

17. One or more non-transitory computer-readable storage media having computer-executable instructions stored thereon which, when executed by one or more computers, cause the one more computers to perform operations comprising:
   receiving a first RSSI data associated with a first base radio antenna;
   receiving a second RSSI data associated with a second base radio antenna;
   determining an average RSSI value utilizing the first RSSI data associated with the first base radio antenna and the second RSSI data associated with the second base radio antenna; and
   determining a proximity of a mobile radio to a base radio utilizing the average RSSI value.

18. The one or more non-transitory computer-readable storage media of claim 17, wherein the proximity is an in-proximity state or a not-in-proximity state.

19. The one or more non-transitory computer-readable storage media of claim 17, wherein determining a proximity of a mobile radio utilizing the average RSSI value comprises determining whether the average RSSI value is above or below a threshold RS SI value.

20. The one or more non-transitory computer-readable storage media of claim 17, the operations further comprising receiving an initial RSSI data and making an initial range determination prior to receiving the first RSSI data and the second RSSI data.

21. A method for determining a proximity of a mobile radio comprising:
   determining a noise level on a communications channel between a mobile radio and a base radio; and
   processing the noise level to determine whether to make a range determination utilizing signal measurements from both a base radio first antenna and a base radio second antenna.

22. The method of claim 21, wherein the range determination is made by:
   measuring a first RSSI value using the base radio first antenna;
   measuring a second RSSI value using the base radio second antenna;
   generating an average RSSI value utilizing the first RSSI value and the second RSSI value; and
   generating a proximity indication utilizing the average RSSI value.

23. The method of claim 22, wherein, the proximity indication is whether the mobile radio is within a threshold distance from the base radio.

24. The method of claim 23, wherein threshold distance corresponds to a distance at which a user can view a computing device display screen associated with the base radio.

25. The method of claim 21, wherein the noise level is a bit error rate or a RF signal-to- noise ratio.

* * * * *